Patented Jan. 21, 1930

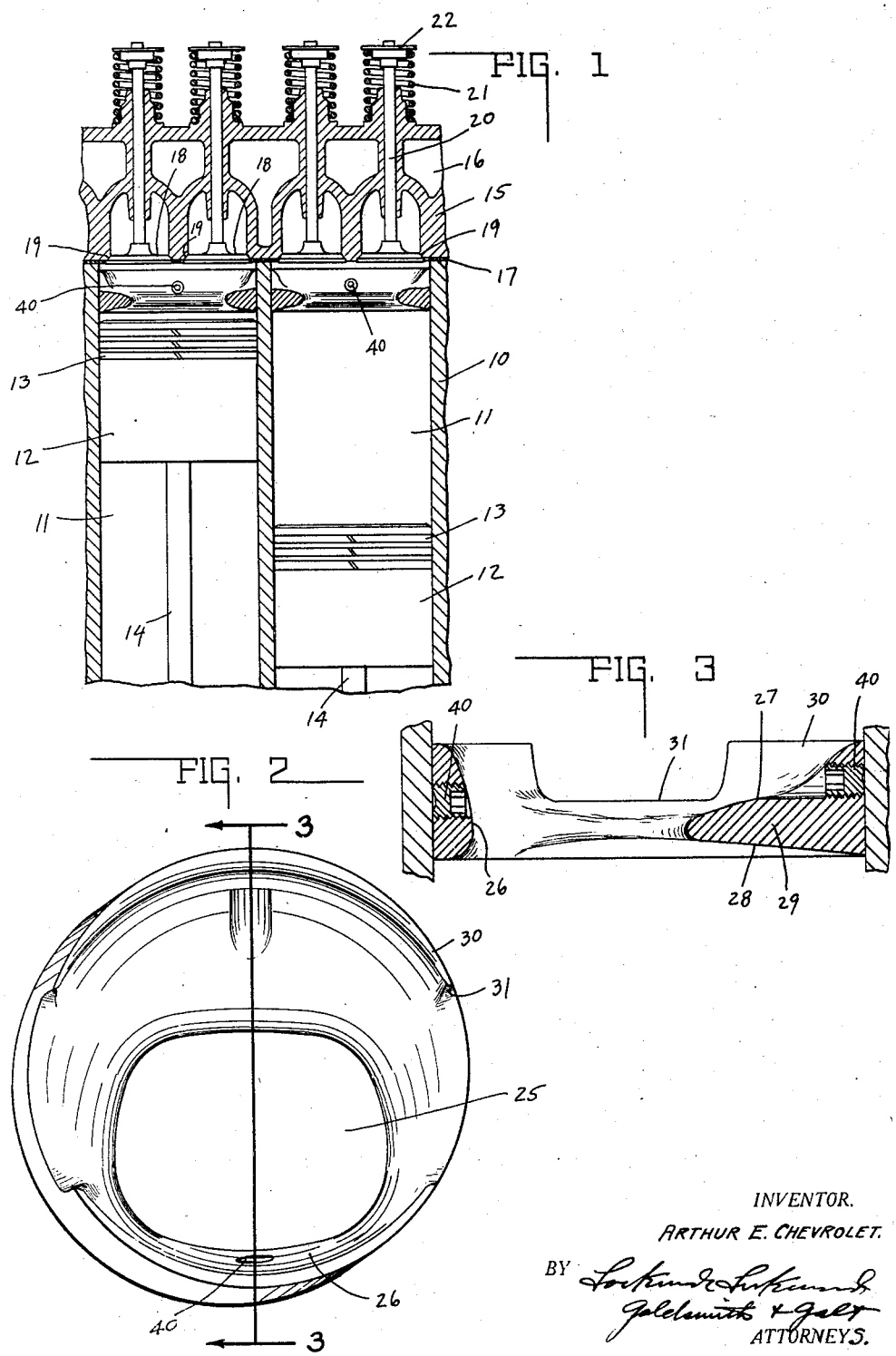

1,744,526

UNITED STATES PATENT OFFICE

ARTHUR E. CHEVROLET, OF INDIANAPOLIS, INDIANA

OVERHEAD-VALVE ENGINE

Application filed March 1, 1928. Serial No. 258,333.

This invention relates to an adaptor for obtaining greater efficiency in a combustion chamber.

The chief object of this invention is to permit engine operation at relatively higher compressions, to obtain greater economy, power and efficiency and eliminate the usual accompanying objectionable detonation and to obtain turbulence of the fuel in the cylinder and combustion chamber.

The chief feature of the invention consists in the accomplishment of the foregoing object by the provision of a restriction of suitable conformation in the head of the cylinder or adjacent thereto and adjacent valves of an over-head valve type engine.

Another feature of the invention not only consists in the formation of the same as an adaptor unit, that is, one that may be readily applied to the cylinder engines previously constructed for transforming them, but the particular shape of the adaptor restriction constitutes another feature.

The full nature of the invention will be understood from the accompanying drawings and the following description and claims:

In the drawings Fig. 1 is a longitudinal central sectional view of two adjacent cylinders of a multi-cylinder over-head valve type engine. Fig. 2 is an enlarged top plan view of the adaptor unit. Fig. 3 is an enlarged vertical sectional view taken in a plane of ninety degrees to the section shown in Fig. 1 and on the section line 3—3 of Fig. 2 with the unit in position in a cylinder.

In the drawings there is illustrated two cylinders of a multi-cylinder engine, the cylinders being indicated by the numeral 10 and a combustion space 11 in each of which is mounted the piston 12 having rings 13 and connecting rod 14. Mounted upon the cylinder block 10 is a head construction 15 having a water cooling space 16 and suitable gasket means 17 may be interposed between the block and head, if and when desired. Herein each cylinder is shown provided with a pair of valves, one of which is the exhaust valve and the other of which is the intake valve. The valves are indicated by the numeral 18, the valve seats by the numeral 19, the stems by the numeral 20, the springs associated therewith by the numeral 21 and the retainers generally by the numeral 22. All of the aforesaid constitutes a conventional over-head valve type motor.

The invention contemplates the mounting within each cylinder or in the combustion chamber in the head, if sufficient space is provided, of means for dividing the cylinder space or combusion chamber into two chambers having relatively restricted communication and forming the surfaces of the restricting means such that predetermined fuel flow obtains, towit, turbulence. The restriction eliminates detonation and provides relatively large bodies of metal at the throat of the restriction so that there will be no glow points and therefore there will be no pre-ignition from this cause, if and when the compression is increased by the introduction of a volume reducing member.

The present form of the invention is illustrated as an adaptor unit for a standard overhead valve-type engine. The adaptor consists of a tubular member having a restricted opening 25 eccentric of the cylinder 11 or combustion chamber. The body portion forming the restriction includes a relatively steep wall or surface 26 and a relatively flat but elongated surface 27 and 28 forming a tongue 29 or partition therebetween. It will be noted that the remote wall portion 26 from substantially the mid-portion or thereabouts, is flared outwardly in both directions, the slopes being opposed and quite steep, while the opposite baffle portion is of double incline or wedge shape. Each two opposed slopes of the partition merge into each other, as shown particularly in Figs. 2 and 3, with what might be termed an arcuately sectioned wall forming the throat, the radius of which increases for the portions more remote from the axis. The substantially cylindrical exterior wall 30 at opposite sides is cut away at 31 to provide for valve clearance permitting the valves to move into the cylinder or combustion chamber when opened. The adaptor may be press fitted into the combustion chamber or otherwise secured, as shown particularly in Fig. 3 where headless set screws 40 are mounted in the adaptor and engage the adjacent cylinder wall.

Upon the intake stroke part of the gas, it will be apparent, discharges directly through opening 25, while the remainder of the gas engages the upper inclined surface adjacent the restriction and is caused to swirl before it can pass through the opening 25. In other words, there is created a turbulent condition in the fuel upon the intake thereof. Also by reason of the reverse curvature or multiple inclination construction, upon the compression stroke the gas is forced from the cylinder into the chamber above the partition 29 and with a swirling motion similar to that obtained upon the intake so that turbulence is again obtained and the adaptor, therefore, secures multiple turbulence. The result is greater economy, greater power, greater efficiency and no detonation. The objection to increasing the compression of a standard overhead valve-type engine is that the same is liable to cause detonation and pre-ignition, or both. With the present invention high compressions can be utilized without detonation and pre-ignition occurring. There is no glow point in the device, which, when heated to the engine temperature, will pre-ignite the mixture prior to firing by the plug. Also when the mixture is fired the same or initial explosion takes place in the restricted chamber above the cylinder chamber proper and as the combustion increases the flame passes through the throat defined by opening 25 and the remainder of the gas burns. The result is a long and steady burning which has the exact opposite attributes from that of detonation and as a result there is a longer and substantially continuous application of power to the head of the piston, by reason of the longer burning of the gas and as a result greater force (of expansion) is exerted upon the piston.

The present invention, therefore, not only diminishes the strength of the initial explosion, and therefore eliminates detonation, but secures a uniform and readily combustible fuel mixture in substantially vapor form by reason of the double swirling, that is the swirling upon the intake and the swirling upon the compression strokes of the engine.

While the invention is herein disclosed as an adaptor, it is to be understood that the same may be cast integral with either the cylinder head or the block or a part in both and the water cooling jacket space extended into the metal forming the restriction to water cool the same.

The invention claimed is:

1. In an overhead valve, high compression, internal combustion engine, the combination with a substantially cylindrical cylinder, a piston therein, a head portion for the cylinder, and valves mounted in said head portion controlling intake and exhaust to and from said cylinder respectively, of a turbulence producing partition portion reducing the clearance volume of the engine, said partition including an aperture therethrough, said aperture being positioned eccentrically of the cylinder axis, the opposite surfaces of the partition sloping from the cylinder towards the aperture in inclined relation and merging at the aperture, said partition obtaining turbulence upon the intake and compression periods of engine operation.

2. In an overhead valve, high compression, internal combustion engine, the combination with a substantially cylindrical cylinder, a piston therein, a head portion for the cylinder, and valves mounted in said head portion controlling intake and exhaust to and from said cylinder respectively, of a turbulence producing partition portion reducing the clearance volume of the engine, said partition including an aperture therethrough, said aperture being positioned eccentrically of the cylinder axis, the opposite surfaces of the partition sloping from the cylinder towards the aperture in inclined relation and merging at the aperture with a substantially arcuate cross-sectioned wall forming the throat of the aperture, said partition obtaining turbulence upon the intake and compression periods of engine operation.

3. In an overhead valve, high compression, internal combustion engine, the combination with a substantially cylindrical cylinder, a piston therein, a head portion for the cylinder, and valves mounted in said head portion controlling intake and exhaust to and from said cylinder respectively, of a turbulence producing partition portion reducing the clearance volume of the engine, said partition including an aperture therethrough, said aperture being positioned eccentrically of the cylinder axis, the opposite surfaces of the partition sloping from the cylinder towards the aperture in inclined relation and merging at the aperture, the portions of the partition surfaces more remote from the axis having a greater slope than the diametrically opposite portions, said partition obtaining turbulence upon the intake and compression periods of engine operation.

4. In an overhead valve, high compression, internal combustion engine, the combination with a substantially cylindrical cylinder, a piston therein, a head portion for the cylinder, and valves mounted in said head portion controlling intake and exhaust to and from said cylinder respectively, of a turbulence producing partition portion reducing the clearance volume of the engine, said partition including an aperture therethrough, said aperture being positioned eccentrically of the cylinder axis, the opposite surfaces of the partition sloping from the cylinder towards the aperture in inclined relation and merging at the aperture, the partition surface adjacent the head having a greater slope than the longitudinal opposite portion of the surface adjacent the piston, said partition obtaining turbulence upon the intake and compression periods of engine operation.

5. In an overhead valve, high compression, internal combustion engine, the combination with a substantially cylindrical cylinder, a piston therein, a head portion for the cylinder, and valves mounted in said head portion controlling intake and exhaust to and from said cylinder respectively, of a turbulence producing partition portion reducing the clearance volume of the engine, said partition including an aperture therethrough, said aperture being positioned eccentrically of the cylinder axis, the opposite surfaces of the partition sloping from the cylinder towards the aperture in inclined relation and merging at the aperture, the portions of the partition surfaces more remote from the axis having a greater slope than the diametrically opposite portions, the partition surface adjacent the head having a greater slope than the longitudinal opposite portion of the surface adjacent the piston, said partition obtaining turbulence upon the intake and compression periods of engine operation.

6. In an overhead valve, high compression, internal combustion engine, the combination with a substantially cylindrical cylinder, a piston therein, a head portion for the cylinder, and valves mounted in said head portion controlling intake and exhaust to and from said cylinder respectively, of a turbulence producing partition portion reducing the clearance volume of the engine, said partition including an aperture therethrough, said aperture being positioned eccentrically of the cylinder axis, the opposite surfaces of the partition sloping from the cylinder towards the aperture in inclined relation and merging at the aperture with a substantially arcuate cross-sectioned wall forming the throat of the aperture, the portions of the partition surfaces more remote from the axis having a greater slope than the diametrically opposite portions, said partition obtaining turbulence upon the intake and compression periods of engine operation.

7. In an overhead valve, high compression, internal combustion engine, the combination with a substantially cylindrical cylinder, a piston therein, a head portion for the cylinder, and valves mounted in said head portion controlling intake and exhaust to and from said cylinder respectively, of a turbulence producing partition portion reducing the clearance volume of the engine, said partition including an aperture therethrough, said aperture being positioned eccentrically of the cylinder axis, the opposite surfaces of the partition sloping from the cylinder towards the aperture in inclined relation and merging at the aperture with a substantially arcuate cross-sectioned wall forming the throat of the aperture, the partition surface adjacent the head having a greater slope than the longitudinal opposite portion of the surface adjacent the piston, said partition obtaining turbulence upon the intake and compression periods of engine operation.

8. In an overhead valve, high compression, internal combustion engine, the combination with a substantially cylindrical cylinder, a piston therein, a head portion for the cylinder, and valves mounted in said head portion controlling intake and exhaust to and from said cylinder respectively, of a turbulence producing partition portion reducing the clearance volume of the engine, said partition including an aperture therethrough, said aperture being positioned eccentrically of the cylinder axis, the opposite surfaces of the partition sloping from the cylinder towards the aperture in inclined relation and merging at the aperture with a substantially arcuate cross-sectioned wall forming the throat of the aperture, the portions of the partition surfaces more remote from the axis having a greater slope than the diametrically opposite portions, the partition surface adjacent the head having a greater slope than the longitudinal opposite portion of the surface adjacent the piston, said partition obtaining turbulence upon the intake and compression periods of engine operation.

9. In an overhead valve, high compression, internal combustion engine, the combination with a substantially cylindrical cylinder, a piston therein, a head portion for the cylinder, and valves mounted in said head portion controlling intake and exhaust to and from said cylinder respectively, of a turbulence producing partition portion reducing the clearance volume of the engine, said partition including an aperture therethrough, said aperture being positioned eccentrically of the cylinder axis, the opposite surfaces of the partition sloping from the cylinder towards the aperture in inclined relation and merging at the aperture, said partition portion at the sides immediately adjacent the cylinder wall being suitably relieved for valve clearance, said partition obtaining turbulence upon the intake and compression periods of engine operation.

In witness whereof, I have hereunto affixed by signature.

ARTHUR E. CHEVROLET.